United States Patent
Chandra et al.

(10) Patent No.: US 7,403,774 B2
(45) Date of Patent: Jul. 22, 2008

(54) UNCONNECTED POWER SAVE MODE FOR IMPROVING BATTERY LIFE OF WIRELESS STATIONS IN WIRELESS LOCAL AREA NETWORKS

(75) Inventors: Praphul Chandra, Germantown, MD (US); David Lide, Rockville, MD (US); Manoj Sindhwani, Oak Hill, VA (US)

(73) Assignee: Texas Instruments Incorporated, Dallas, TX (US)

( * ) Notice: Subject to any disclaimer, the term of this patent is extended or adjusted under 35 U.S.C. 154(b) by 800 days.

(21) Appl. No.: 10/953,289

(22) Filed: Sep. 29, 2004

(65) Prior Publication Data

US 2006/0068751 A1    Mar. 30, 2006

(51) Int. Cl.
    *H04Q 7/20* (2006.01)
(52) U.S. Cl. ............. 455/432.1; 455/434; 455/574; 455/343.2; 370/338
(58) Field of Classification Search ............. 455/432.1, 455/434, 436, 515, 574, 161.1, 343.1, 343.2; 370/338
See application file for complete search history.

(56) References Cited

U.S. PATENT DOCUMENTS

| | | | |
|---|---|---|---|
| 5,754,956 A * | 5/1998 | Abreu et al. | 455/434 |
| 6,332,077 B1 * | 12/2001 | Wu et al. | 455/432.1 |
| 7,116,979 B2 * | 10/2006 | Backes et al. | 455/434 |
| 2004/0033812 A1 * | 2/2004 | Matsunaga et al. | 455/557 |
| 2005/0068928 A1 * | 3/2005 | Smith et al. | 370/338 |

FOREIGN PATENT DOCUMENTS

WO    0076171 A1    12/2000

OTHER PUBLICATIONS

Sachin Gar et al, "On the Throughput of 802.11b Networks for VoIP", Mar. 3, 2002, pp. 1-13.
Arunesh Mishra et al, "An Empirical Analysis of the IEEE 802.11 MAC Layer Handoff Process" (8 pages).

* cited by examiner

*Primary Examiner*—Nguyen Vo
(74) *Attorney, Agent, or Firm*—Steven A. Shaw; W. James Brady; Frederick J. Telecky, Jr.

(57) ABSTRACT

An unconnected power save method reduces the battery consumption of a wireless station in a wireless local area network (WLAN). A wireless station enters a sleep mode between scans for a prospective access point. The sleep duration time is determined using the current position of the station relative to the WLAN network topology.

17 Claims, 4 Drawing Sheets

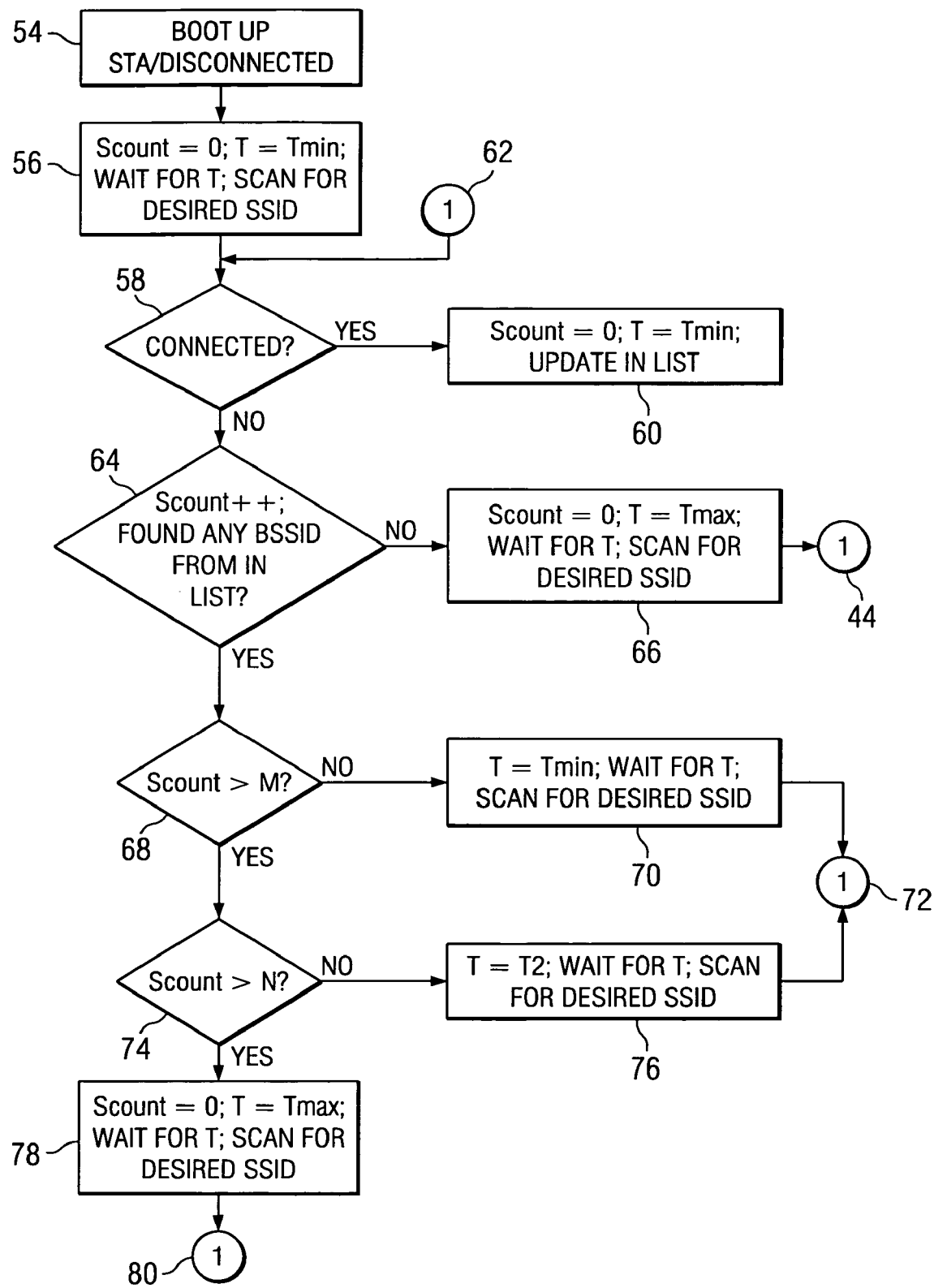

UNCONNECTED POWER SAVE MODE FOR IMPROVING BATTERY LIFE OF WIRELESS STATIONS IN WIRELESS LOCAL AREA NETWORKS

CROSS-REFERENCE TO RELATED APPLICATIONS

None

FIELD OF THE INVENTION

The present invention relates generally to creating power saving techniques for wireless local area network (WLAN) endpoint stations (STAs). More specifically, preferred embodiments provide an unconnected power save scheme that reduces the battery consumption of a station.

BACKGROUND OF THE INVENTION

WLANs (Wireless Local Area Networks) utilize RF (Radio Frequency) signals or light signals to connect mobile endpoints to each other or to a centralized gateway and transmit data over a wireless medium between the physical endpoints or between a mobile endpoint and an endpoint on a network that is connected to the WLAN. In 1997 the IEEE published standards for WLANs under the title of 802.11 (also known as "Wi-Fi"). For example, The IEEE 802.11b and 802.11g protocols have gained popularity over the past few years and deployment of networks using these protocols are expected to increase significantly in the near future. Currently, most of these networks are used for data access from laptop computers and personal digital assistants (PDAs) through wireless network interface cards (NICs).

The basic hardware of an IEEE 802.11 network is the BSS (Basic Service Set), which is merely a number of endpoint stations that can communicate with one another or with an access point (AP). In a BSS, IEEE 802.11 enables mobile to communicate, through a wireless network interface, directly with each other or with other STAs through an AP, which is a centralized gateway providing message and power management and access to an external LAN (Local Area Network) and/or the Internet. An Extended Service Set (ESS) can include a combination of BSSs or other network components and nodes.

There exists a plurality of 802.11 standards that each use different frequency bands and have varying data transmission speeds. The original IEEE 802.11 standard supported wireless interfaces operating at speeds of up to 2 megabit per second (Mbps) in the 2.4 GHz radio band. By using different modulation techniques, IEEE 802.11b raised the data transmission rates to 11 Mbps, while 802.11a supports up to 54 Mbps transmission rates at a 5 GHz frequency. The IEEE 802.11g is developing standards for data transmission rates of 54 Mbps at the 2.4 GHz frequency.

WLANs under 802.11 use media access control (MAC) protocols to transmit between wired and wireless devices. Each wireless NIC is assigned a MAC address used to identify the STA. The access to wireless networks is controlled by coordination functions. The distributed coordination function (DCF) provides access similar to Ethernet CSMA/CD access. The DCF determines if the RF link between devices is clear prior to transmitting. Stations use a random backoff after every frame to avoid collisions.

FIG. 1 illustrates a schematic diagram of an exemplary WLAN enterprise network 10. Two wireless APs 12 and 14 are connected to an internal corporate Intranet 18. The Internet 20 may be accessed through intranet 28 or alternatively through APs 12, 14 after registering with a Radius authentication server 22. APs 12, 14 have Multiple APs 12 and 14 provide an enterprise-wide footprint of RF broadcast signals that can be accessed up to a combined geographic range that is represented by coverage ring 24. The extent of coverage and signal power depends upon numerous factors including broadcast signal power, natural signal attenuation, and interferences. An enterprise network typically has multiple APs distributed throughout an office or between multiple buildings so that a mobile station (STA) may access the network from nearly anywhere in the RF broadcast area 24. Since an 802.11 WLAN is traditionally a data network, a wireless endpoint such as laptop computer 16 may access the Internet 20. However, a user may also place and receive phone calls using a WIPP (Wireless Internet Protocol Phone or IP Phone) on WLAN 10 using voice data protocols, such as voice over Internet Protocol (VoIP).

One of the major concerns in 802.11 networks is the limited battery life of 802.11 handheld STAs. The power consumption of a STA depends on the STA's mode of operation. The active mode is defined as the time when the STA is connected to the AP and is in a communication session, i.e. exchanging data with the AP. The standby mode usually refers to the mode where the STA is connected to the AP but there is no ongoing session, i.e. there is no data being exchanged between the STA and the AP.

The 802.11 standard from IEEE (Institute of Electrical and Electronic Engineers) proposes a "doze" mode wherein a STA may "doze" (go to "sleep") in order to save power, provided the STA informs the AP that the STA is entering the doze mode. This "dozing" algorithm standard significantly decreases the power consumption of the STA both in the active and the standby modes.

Although the 802.11 doze mode is useful for decreasing power consumption in the active and standby modes, there is a mode of a STA that the standard protocol fails to address. This mode is defined herein as the "unconnected" mode. For example, if a STA is out of range of an ESS, there is no AP in the STA's vicinity with which to connect. The default behavior of such an out-of-range STA is to continue scanning for the desired SSID (with the desired security, rates, settings, etc.). Therefore, in the unconnected state, the STA will continue to consume full-power even though there is no active session. This behavior drastically reduces the battery life of the out-of-range STA.

SUMMARY

The limitations of the prior art are overcome by the present invention's unconnected power save (UPS) method for a wireless station in a wireless local area network. As described above, if a STA is out of range of a wireless LAN Extended Service Set (ESS), there is no access point (AP) in the STA's vicinity with which to connect. The default behavior of such an out-of-range STA is to continue scanning for the desired Service Set Identity, or SSID (with the desired security, rates, settings, etc.). The SSID is a string used to identify a service set that can be recognized by a STA.

Therefore, in the unconnected state, the STA will continue to consume full-power even though there is no active session. This behavior drastically reduces the battery life of the out-of-range STA. Further, if no connection is made, the wireless STA enters a doze mode between scans. A user may be placing an receiving phone calls in an ESS with wireless IP phone (WIPP). If the phone has moved out of range of a desired AP, the phone will remains in a doze mode before re-connection to another desired AP causing the user to miss incoming calls. The present invention reduces a "sleep" time between incoming scans in this unconnected mode so that fewer incoming calls to a WIPP are missed. The present invention also provides a more efficient sleeping and scanning method that extends the battery life of a handheld WLAN station.

The preferred embodiment defines an Unconnected Power Save (UPS) method that reduces battery power consumption of a STA when the STA is in the UPS mode. Further, the UPS method optimizes the sleep time between scans of an unconnected WIPP so that a WIPP in sleep or doze mode can connect to an AP quicker and miss fewer incoming calls. As one skilled in the art will recognize, the present invention is not limited to WIPPs and can be applied to any wireless endpoint station, such as wireless handheld Palm®-type devices and notebook computers using wireless network interface cards.

The preferred embodiment uses a method of memorizing the identification of APs that are relatively nearby a desired AP and manipulating a sleep mode of a wireless STA, depending on how close the STA is located to the desired AP. Further, the periodicity of scans by the STA for a desired AP are increased when the STA recognizes identifying signals from an AP that is located geographically near to the desired AP.

BRIEF DESCRIPTION OF THE DRAWINGS

Preferred embodiments of the invention are discussed hereinafter in reference to the drawings, in which:

FIG. 4 illustrates a flowchart of the unconnected power save method of the preferred embodiment.

DETAILED DESCRIPTION OF PREFERRED EMBODIMENTS

Figure 1:
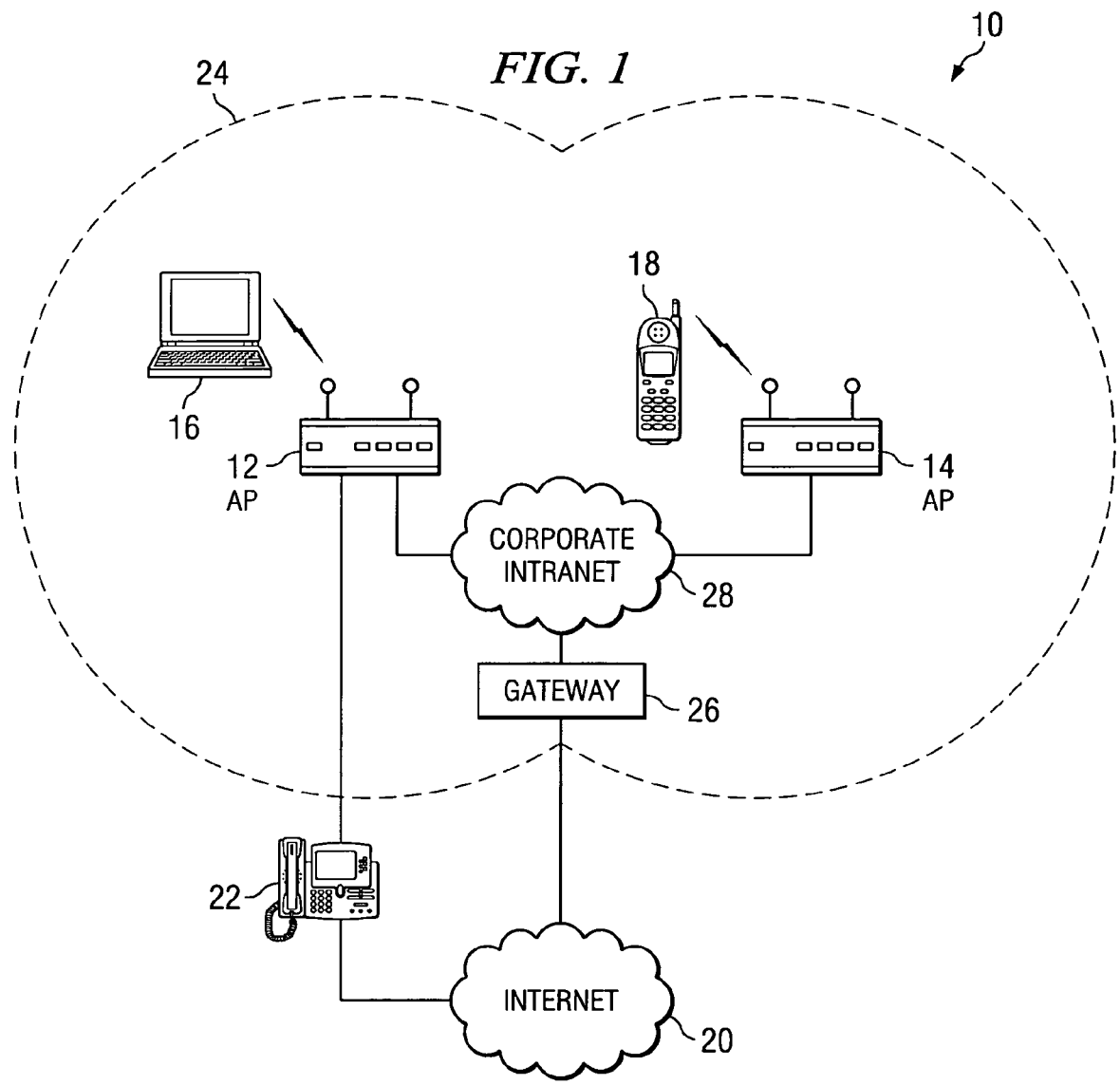
FIG. 1 illustrates an enterprise wireless local area network.
Figure 2:
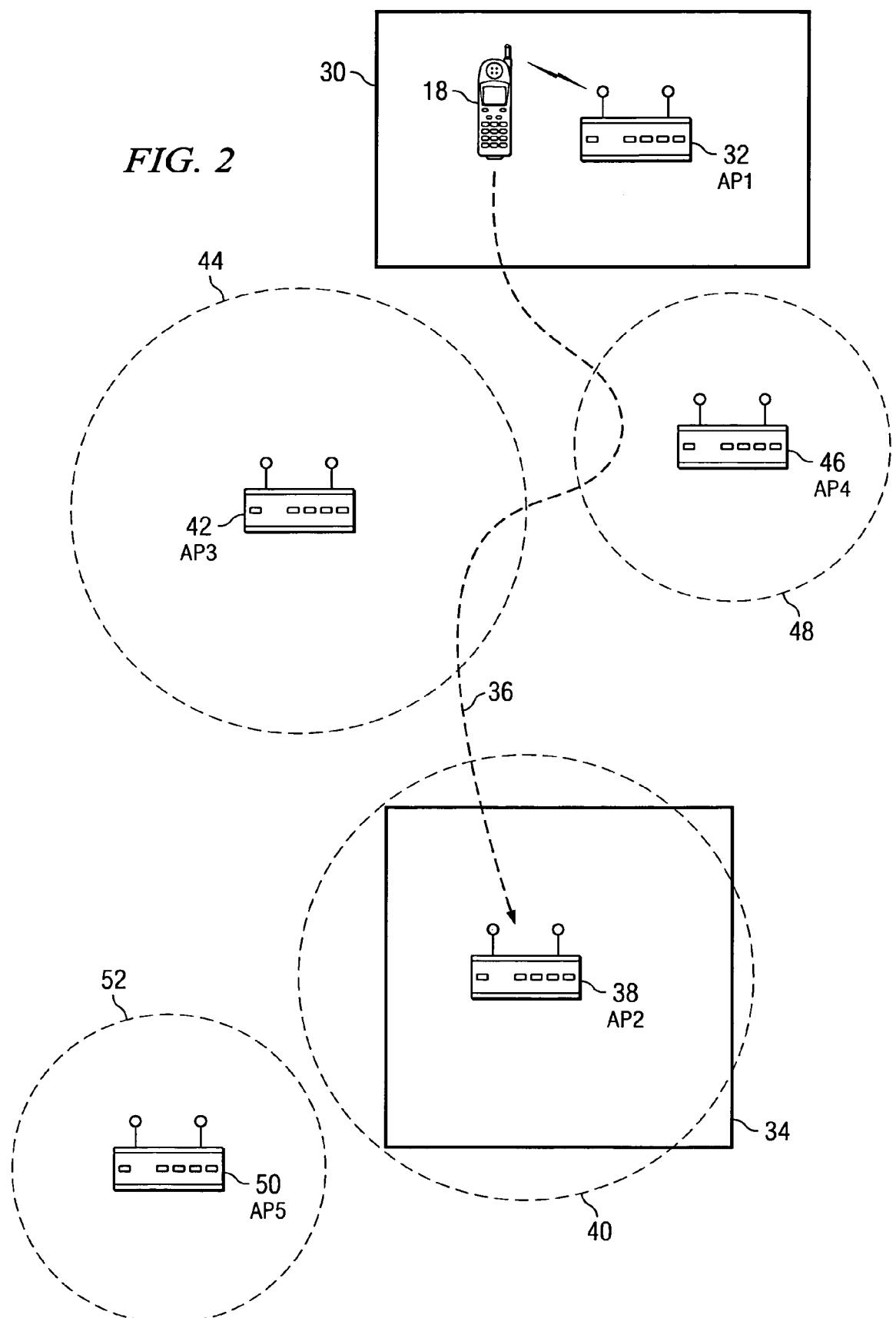
FIG. 2 is a diagram of a wireless station connected to a desired access point with neighboring access points nearby.

The preferred embodiment of the present invention includes a technique to reduce power consumption of an endpoint station (STA) that is in an unconnected state in a wireless local area network (WLAN). FIG. 2 illustrates a diagram where wireless Internet Protocol Phone (WIPP) 18 that is located inside building 30. WIPP 18 is connected to access point AP1 32 inside building 30 and can make and receive calls through AP1. Line of travel 36 shows the path that a user holding WIPP 18 will traverse in order to move out of building 30 and enter building 34. AP2 38 is located inside building 34 and is a desired AP with which WIPP 18 can also connect to make and receive calls. AP2 38 has an approximate radio frequency (RF) propagation area that is represented by coverage ring 40.

Other APs located nearby the desired AP2 38 include AP3 42 having coverage ring 44, AP4 46 having coverage ring 48, and AP5 50 having coverage ring 52. Although WIPP 18 can detect Basic Service Set Identifiers (BSSIDs) from APs 42 46, and 50 during a scan (when WIPP 18 is within each respective AP's RF propagation area), WIPP 18 cannot connect to these neighboring APs due to security settings blocking access and/or a foreign access provider at each of the neighboring APs. A BSSID is a 48-bit identifier used by all APs in a BSS that distinguishes one distinct BSS from another.

After WIPP 18 exits building 30 and leaves an RF propagation area of AP1 (not shown), WIPP 18 will be unconnected to AP1 but cannot connect to AP2 38 until the phone is within AP2's propagation area 40. When WIPP 18 fails to detect any RF signals from any AP, the phone will enter a sleep mode for a configurable amount of time (e.g., a two-minute sleep mode) before a subsequent scan is performed for a desired AP in order to save battery life. When the WIPP 18 performs a scan, all channels are scanned to search for signal responses from an AP. As the user travels along traverse path 36, WIPP 18 first enters the propagation area 48 and detects identifying signals from AP4. WIPP 18 detects and memorizes the BSSID of AP4 46, but cannot connect to AP4. One reason for failure of connection could be that WIPP 18 is not associated with the service provider for AP4. Since a BSSID from an AP was detected but no connection was made, WIPP 18 preferably enters a shortened sleep mode.

Figure 3:
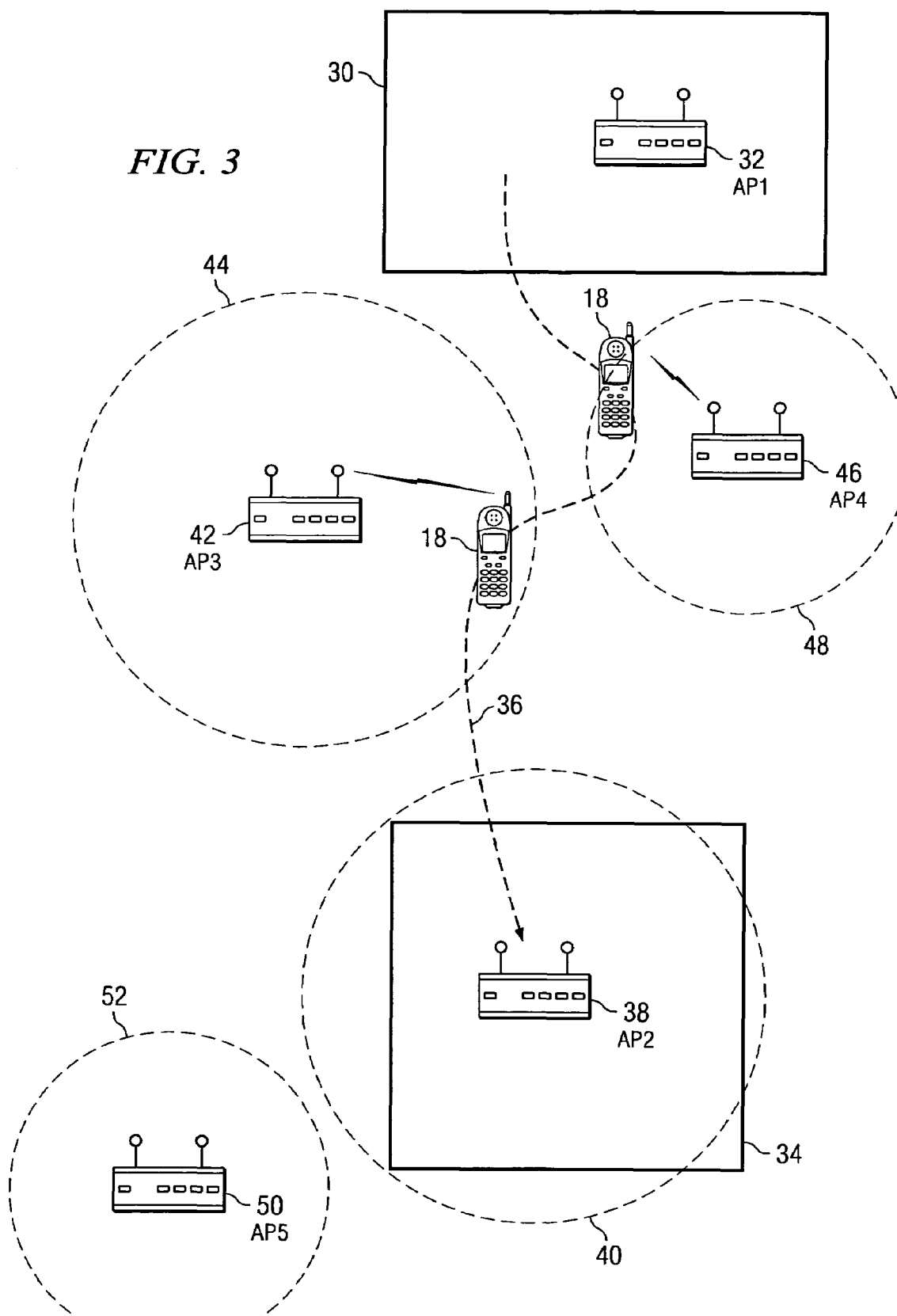
FIG. 3 is a diagram of a wireless station connected to a neighboring access point and moving to a desired access point.

Referring to FIG. 3, a user holding WIPP 18 continues along 36, leaves AP4 signal propagation area 48, and enters AP3 signal propagation area 44. WIPP 18 then detects identifying signals from AP3 42. However, WIPP 18 cannot connect to AP3 because the phone may not be associated with the service provider at AP3. Since the BSSID of AP3 42 is detected by WIPP 18, this BSSID is saved into memory along with AP4's BSSID.

When a user with WIPP 18 leaves AP3's signal propagation area 44 along traverse 36 towards building 34, WIPP 18 remains unconnected and preferably in a reduced sleep mode. In this mode, the phone awakens and performs intermittent scans for the BSSID of a desired AP with which it can connect. When the user with WIPP 18 enters propagation area 40 of AP2 38 and continues into building 34, the BSSID of AP2 is detected and recognized as the desired AP. WIPP 18 then connects to AP2 using standard protocols as are known in the art. Since WIPP 18 is connected to AP2 after it detected BSSIDs of AP4 and AP3 while in the reduced sleep mode, WIPP 18 saves the BSSIDs of AP4 and AP3 and memorizes that these two APs are immediate neighbors of the desired AP2.

A next time a user receiving calls on WIPP 18 moves from building 30 to building 34 along traverse 36, the phone will recall from a table that BSSIDs from AP4 and AP3 were encountered in a shortened time prior to receiving signals from desired AP2. This means the phone recognizes that AP3 and AP4 are "neighbors" to AP2. A "neighbor AP" is defined as an AP that was detected during a successful scan but which the STA cannot connect with due to any reason (e.g., a non-matching desired SSID, security setting, out-of-network provider, etc.). Thus, after detecting AP3 and AP4 identifying signals, WIPP 18 will begin scanning in a shortened time frame for an identifying signal containing the BSSID from AP2, and may scan on a reduced number of channels or an exact signal channel used by AP2. If no AP is detected, then the sleep period is increased. However, WIPP 18 knows that AP3 and AP4 are neighbors to AP2 and assumes it is moving closer to its desired access point of AP2 after detecting their respective BSSIDs. Therefore, the sleep period would decrease, and the periodicity of scanning for identifying signals from AP2 would increase. A similar procedure for memorizing and recognizing a neighbor AP would be repeated if WIPP 18 passed through propagation area 52 of AP5 prior to connecting to AP2.

When a user with WIPP 18 leaves AP2's signal propagation area 40 and WIPP 18 detects signals from neighboring AP3 42 and/or AP4 46. WIPP 18 knows that it is moving away from its desired AP2 and therefore increases the time for sleep modes until the WIPP detects BSSIDs from a neighboring AP or a desired AP.

In the preferred embodiment, an algorithm on a processor performs the UPS method by causing a wireless endpoint STA (e.g., WIPP 18) to enter a sleep mode (e.g., switching off unused components) between scans for an AP. Referring to the flow chart in FIG. 4 showing the method of the preferred embodiment, the sleeping-duration (represented by "T" in the flow chart) is determined using the current position of a STA relative to the WLAN network topology. For this purpose, an "Immediate Neighbors List" (IN List) is defined for each STA.

To create an Immediate Neighbors List, whenever a STA successfully connects to an AP, the STA saves into memory the following: a) the BSSID (BSS Identification number) of the AP with which the STA connects, b) the channel number of the AP with which the STA connects, and c) a list of neighboring APs for the connected AP. As a result of the UPS scheme implemented in a BSS, connection time to a desired AP is reduced because the STA scans for one or more specific BSSID's on specific channels instead of a full scan of all possible channels.

The IN List is maintained separately for each SSID and is initialized with all NULL entries. The IN List entries are tabulated and added after each successful scan. A successful scan is defined as a scan resulting in a connection between a STA and an AP. Over a period of time, an exemplary IN List for a particular SSID would resemble the IN List in Table 1, which is for a representative SSID of TI_WLAN.

TABLE 1

IN LIST FOR SSID TI_WLAN

| Neighboring BSSID | Neighbor of (BSSID, Channel) |
| --- | --- |
| 08:00:28:32:24:32 | (08:00:28:32:00:01, 1) |
| 08:00:28:32:12:27 | (08:00:28:32:00:01, 1) |
| 08:00:28:32:19:36 | (08:00:28:32:00:01, 1) |
| . | . |
| . | . |
| . | . |
| 08:00:28:32:61:AB | (08:00:28:32:00:09, 6) |
| 08:00:28:32:00:BC | (08:00:28:32:00:09, 6) |

The neighboring list in Table 1 shows that APs 08:00:28:32:00:01 and 08:00:28:32:00:09 belong to an SSID of the TI_WLAN and operate on channel numbers 1 and 6, respectively. The IN List also shows that the 08:00:28:32:00:01 AP has APs 08:00:28:32:24:32, 08:00:28:32:12:27, and 08:00:28:32:19:36 as its "neighbors." Similarly, Table 1 shows that 08:00:28:32:00:09 AP has APs 08:00:28:32:61:AB and 08:00:28:32:00:BC as its "neighbors."

The IN List forms the basis of the UPS of the preferred embodiment. By using a one or more neighboring APs, the "effective-detection range of an AP" is effectively increased. After each unsuccessful scan by a STA in an unconnected mode that is scanning to connect to the TI_WLAN, the STA compares the list of APs detected during its current scan with the entries in the left column of the IN List in Table 1. If the STA finds a match, the STA "knows" that it is close to a prospective AP that is located in the TI_WLAN (e.g., similar to WIPP 18 knowing it is close to desired AP2 in FIG. 3).

The channel number in the IN List in Table 1 may be optionally maintained by a STA and is a complexity trade-off. Maintaining the channel number allows a STA to determine which channel to scan in order to connect to the prospective AP. This procedure saves valuable time by allowing the STA to scan on only a particular channel rather than the whole channel range.

In the preferred embodiment, an algorithm works by causing a STA to enter a sleep mode (e.g., switching off unused components) between scans for an AP. The sleeping-duration ("T" in the flow chart of FIG. 4) is determined using the current position of the STA relative to the WLAN network topology.

In the flow chart of FIG. 4, the Scount (Scan Count) is defined as the count of the number of unsuccessful consecutive scans that the STA has attempted. M & N are Scan Count thresholds, with M defined as less than N (M<N). The parameter selection of M, N, Tmin, Tmax and T2 are engineering tradeoffs between latency and power consumption.

Referring to FIGS. 3 and 4, when a user with WIPP 18 exits building 30, the WIPP is booted up and disconnected 54 from AP1 32. At this point, in box 56 Scount is zero, T is equal to a minimum time of sleep duration (Tmin) and WIPP 18 sleeps for Tmin (for e.g., 150 msec) and then scans for a desired SSID. If the scan succeeds, WIPP 18 is connected 58 to a desired SSID. Box 60 shows that the Scount remains at zero, T remains at Tmin and the IN List is updated to show any new neighboring SSID's. If a desired SSID is not detected 64, then WIPP 18 compares the BSSIDs discovered during its recent scans with BSSIDs from the IN List (e.g,. AP3, AP4, or AP5 on FIG. 3) in box 64. If WIPP 18 does not detect any BSSID from the IN List 66 then the Scount remains at zero and T increases to Tmax (a non-limiting exemplary time for Tmax could be approximately 3 seconds). The WIPP 18 then sleeps for Tmax and then wakes up and scans for the desired BSSID. The process returns to circle one 62 on the flow chart and the phone continues keeps scanning at Tmax to determine if the WIPP 18 is connected to a desired AP 62, any neighbor AP 64, and if not increasing the Scount by one every scan.

If the user holding WIPP 18 is walking from building 30 towards desired AP2 in building 34 and then encounters propagation signals from AP3, then in box 64 a scan returns an SSID from an AP on the IN List. The Scount increases to one and the Scount is compared if it is greater than threshold M in decision block 68. If Scount is not greater than M then T is reduced to Tmin in block 70 and scanning occurs every 150 msec for the desired SSID since this neighboring AP is close to the desired AP. The flow chart returns at juncture one 72 to decision block 58 to determine a connection to the desired AP (e.g., AP2 in FIG. 3).

If still not connected to a desired AP after scanning a number of times (for example, scanning three times in the embodiment at 150 msec), the Scount becomes greater than M. If the Scount is less or equal to than a maximum threshold N in decision block 74, then the WIPP 18 is continuing to stay unconnected from a desired AP but is still detecting neighbor BSSID's and the T is increased to greater time of T2 but not up to a Tmax. In an exemplary embodiment, T2 could be approximately 300 msec and the WIPP could continue scanning three more times for the desired SSID (however it is understood that these parameters are configurable and non-limiting to the present invention). If the scanning continues and the WIPP remains unconnected, Scount becomes greater than threshold N in decision block 74 the algorithm increases T to Tmax in block 78 and Scount resets to zero. WIPP 18 would then give up scanning at T2 and increase scanning to Tmax in loop 80 while attempting connection to the desired SSID, leading through loop 62 to decision block 58. Once a STA detects a BSSID from an AP on the IN List in block 64, the STA can reduce scanning all available channels in the BSS down to just a single channel that the desired AP is known to use.

The following guidelines provide a framework for selection of parameters:

$$T\min < T2 \ll T\max$$
$$M < N$$

To determine Tmax, the preferred embodiment assumes that a) 802.11 protocols are for Local Area Networking (LAN) technology, b) the average walking speed of a person is 1 meter/second, and c) the typical radius of a BSS is between 45-90 meters. An alternative embodiment of the present invention could provide a Tmax of at least 4-9 seconds for the UPS, however, this selection would reduce an effective range of the BSS by approximately 10%. This means that a STA using UPS would have to approach approximately 10% nearer in proximity to an AP before connecting to the AP. These latency measurements are worst-case values of Tmax which evaluate the case where the STA is approaching the AP from a direction and proximity such that the desired AP is the first AP the STA would encounter (e.g., no neighboring AP's encountered before connecting to the actual desired AP).

Determining Tmin for the preferred embodiment is based primarily upon application requirements. Transmit-oriented STAs where the application session is initiated by the STA can utilize a Tmin as large as a few seconds. However, STAs where the application session can be initiated by reception would use a lower Tmin. An example of an application session requiring a lower Tmin is an incoming call received on a wireless IP telephone using voice over WLAN technology. A guideline for such applications is the observation that a complete scan of all channels can span from approximately 50 msec to approximately 150 msec.

A further guideline for selection of T2 is that the value of T2 should be closer to the value of Tmin than to the value of Tmax. The value of M determines how soon to move from T to T2, and the value of N determines how fast to move from T2 to Tmax when a STA is unable to connect to a desired AP. To account for dead spots in the WLAN (e.g., specific locations within the WLAN RF broadcast area where a STA cannot receive RF signals) the value for M should be greater than or equal to two.

In an exemplary UPS method, the following values in Table 2 may be used to complete the UPS method. However, as one skilled in the art will realize, these values are merely for a single example of types of data used in an exemplary embodiment and may vary greatly according to guidelines described herein:

Table 2: Exemplary Values for the UPS Procedure
Tmin=500 msec.
T2=4 seconds
Tmax=30 seconds
M=3
N=6

If battery life of a STA is more important than latency, M and N may be reduced to increase the values of Tmin, T2, and Tmax. If latency is more important, the opposite method applies (e.g., M and N values may be increased to decrease the values of Tmin, T2, and Tmax). To automate the process, the parameter values may be varied dynamically, depending upon batter life-time left, time-of-day, etc. For example, if the STA is low on battery and is in an unconnected mode, Tmax may be increased. If the STA is low on battery in a connected state, Tmin may be increased and N may be decreased.

For a measure of power saved due to the preferred embodiment, consider as an example a STA which consumes 300 mA when in an active session and 10 mA when it is sleeping. With a 900 mAH battery, a STA without UPS would burn out its battery in three hours in an unconnected mode. The same STA with UPS using Tmax=4 seconds would last approximately forty hours.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed:

1. A method for improving battery life of a wireless device in a wireless local area network having a topology, said method comprising:
    scanning, with a wireless station, for an identifying signal from a prospective access point in a wireless local area network;
    memorizing, during said scanning, identifying signals from one or more access points that are geographically near to said prospective access point;
    entering an unconnected power save mode, wherein the wireless device is in a sleep mode having a sleep mode duration which is determined using the current position of the wireless device relative to the wireless local area network topology; and
    reducing a sleep mode duration of said wireless station when said wireless station detects said memorized identifying signals.

2. The method of claim 1, wherein if said wireless station fails to detect said identifying signal from said prospective AP, increasing said sleep mode duration of said wireless station after said wireless station unsuccessfully scans for said identifying signal from said prospective access point.

3. The method of claim 2, wherein said increasing said sleep mode duration further comprises increasing a time of said sleep mode when a number of scans for said prospective access point by said wireless station is greater than a threshold number of scans.

4. The method of claim 1, wherein said memorizing comprises creating a list of said identifying signals from said one or more access points that are near to said prospective access point; and
    if said wireless station detects and connects to said prospective access point, updating said list with identification numbers of said one or more access points and a channel number of said connected prospective access point.

5. The method of claim 4, further comprising:
    determining if said wireless station is near to said prospective access point by matching identifying signals from any access points detected during a current scan to said memorized list of identifying signals of said near access points.

6. The method of claim 1, further comprising:
    memorizing a list of one or more channels used by said prospective access point; and
    scanning only said one or more channels in order to said identifying signal from said prospective access point.

7. The method of claim 1, wherein said reducing comprises adjusting said sleep mode according to minimum thresholds of time of said sleep mode.

8. The method of claim 7, wherein said thresholds of said sleep mode are determined based upon unsuccessful scan count thresholds of said wireless station.

9. The method of claim 1, wherein said increasing comprises adjusting said sleep mode according to maximum thresholds of time of said sleep mode.

10. The method of claim 1, wherein said scanning comprises scanning, with a wireless Internet Protocol telephone.

11. A method for improving battery life of a wireless device in an IEEE 802.11 wireless local area network (WLAN), comprising:

scanning, with a wireless station, for wireless signals from access points containing basic service set identification numbers (BSSIDs);

creating a list of said BSSIDS detected from said scanning;

determining if said wireless station is close to a prospective access point by comparing said list of said BSSIDs of said access points to a list of BSSIDs of neighboring access points to said prospective access point; and if said station is close to said prospective access point, increasing the periodicity of scans by said station for said prospective access point.

12. The method of claim 11, further comprising:

if said wireless station is close to said prospective access point but remains unconnected after said increased periodicity of scans, then increasing said time of said sleep mode.

13. The method of claim 12, wherein said increasing said time of said sleep mode further comprises increasing said time of said sleep mode when a number of scans for said prospective access point by said wireless station is greater than a threshold number of scans.

14. The method of claim 11, further comprising:

if said wireless station connects to said prospective access point, updating said neighbor list with BSSIDs from said scans of said access points.

15. The method of claim 11, further comprising:

saving a list of particular channels used by said prospective access point; and scanning only said particular channels in order to connect to said prospective access point.

16. The method of claim 11, wherein said reducing comprises adjusting said sleep mode according minimum and maximum thresholds of time of said sleep mode.

17. The method of claim 16, wherein said minimum and maximum thresholds of said sleep mode are determined based upon minimum and maximum unsuccessful scan count thresholds.

* * * * *